INVENTOR.
GEORGE F. QUITTNER
BY
Richard MacCutcheon
ATTORNEY

INVENTOR.
GEORGE F. QUITTNER
BY
Richard MacCutcheon
ATTORNEY

INVENTOR.
GEORGE F. QUITTNER
BY
Richard MacCutcheon
ATTORNEY

INVENTOR.
GEORGE F. QUITTNER
BY
Richard MacCutcheon
ATTORNEY

April 5, 1966 G. F. QUITTNER 3,244,970
ELECTRICAL CIRCUITS FOR SOCKETS USABLE WITH
PLUGGABLE MODULES FOR FLAW DETECTION
Filed Dec. 15, 1961 6 Sheets-Sheet 5

INVENTOR.
GEORGE F. QUITTNER
BY
Richard MacCutcheon
ATTORNEY

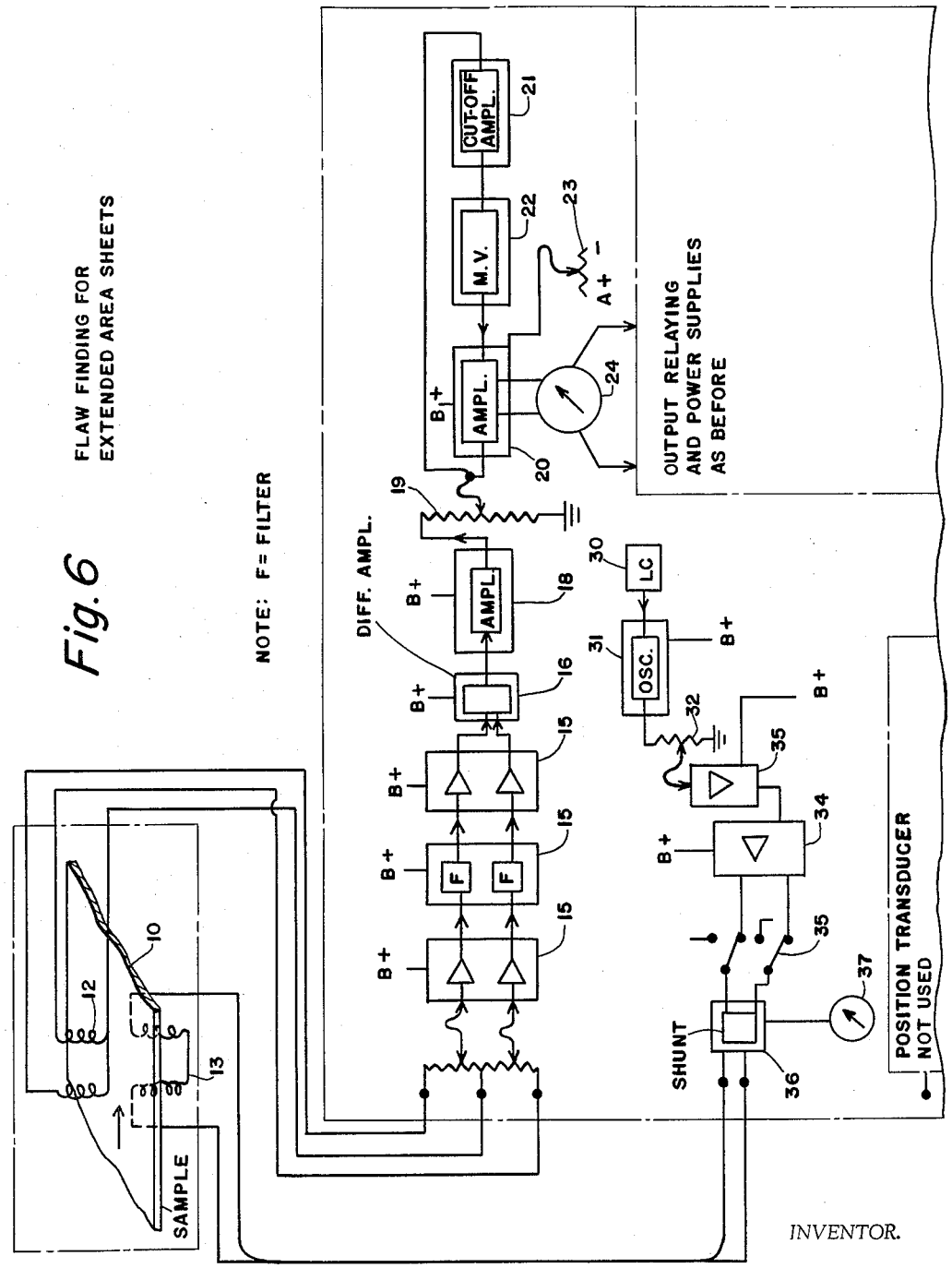

United States Patent Office 3,244,970
Patented Apr. 5, 1966

3,244,970
ELECTRICAL CIRCUITS FOR SOCKETS USABLE WITH PLUGGABLE MODULES FOR FLAW DETECTION
George F. Quittner, Cleveland Heights, Ohio, assignor to Assembly Products, Inc., Chesterland, Ohio, a corporation of Ohio
Filed Dec. 15, 1961, Ser. No. 159,553
6 Claims. (Cl. 324—34)

The present invention relates to flaw detection devices, and has particular significance in connection with apparatus for finding flaws in manufactured articles which are handled in relatively extended lengths, such as wire, rod, tubing, sheet and plate strip, and the like.

It is well known to examine materials non-destructively during and after manufacture, using techniques such as magnetic permeability checking, eddy current testing, or capacitance sensing, to find such conditions as holes, welds, material laminations, and so on. Specific techniques for performing such tests are disclosed in my copending U.S. patent applications Ser. No. 82,348, filed Jan. 12, 1961, now abandoned; Ser. No. 94,472, filed Mar. 9, 1961; and Ser. No. 122,748, filed July 10, 1961. All applications referred to herein are owned by the assignee of the present invention.

Although devices for performing such tests are articles of commerce and of material utility industrially, they are of a somewhat complex and specialized nature and necessarily different and expensive. Their cost limits their usefulness in two ways. The purchaser is reluctant to fully equip his plant, because though his products vary in specifications and problems, he cannot economically have many expensive inspection equipments on the shelf awaiting need for their services. In the plant of the inspection equipment developer, similar objections make it uneconomical to work on many different kinds of specialized equipment with limited personnel and funds.

It is an object of the present invention to provide simple and inexpensible means for overcoming the above difficulties.

Various other objects, and advantages, will become apparent and the invention may be better understood from consideration of the accompanying drawings, specification and claims.

In the drawings:

FIG. 6 shows the general schematic as used for another type of non-destructive testing, e.g. with pickups on opposite side of a sample sheet as regards location of flux or eddy current excitation means.

The present invention comprises electronic flaw detection apparatus having the usual mechanical chassis for supporting electrical components. Except for a relatively few parts the chassis supports only a number of identical mechanically engageable electrical sockets which are prewired (that is, before plug-in) in unique manner to make the apparatus operable for a variety of circuits. To complete such circuits suitable modules, which contain circuitry including conventional electronic components, are provided with prong or other type connectors for mating with the respective sockets. Because each operative system circuit is, in substantial part, determined by what modules are plugged in at a time later than the time when the chassis sockets were wired, the wiring between sockets in hereinafter referred to as "prewiring."

In all the drawings, signal lines are schematically shown rather than wire pairs, except where clarity might suffer from such simplification.

Figure 1:
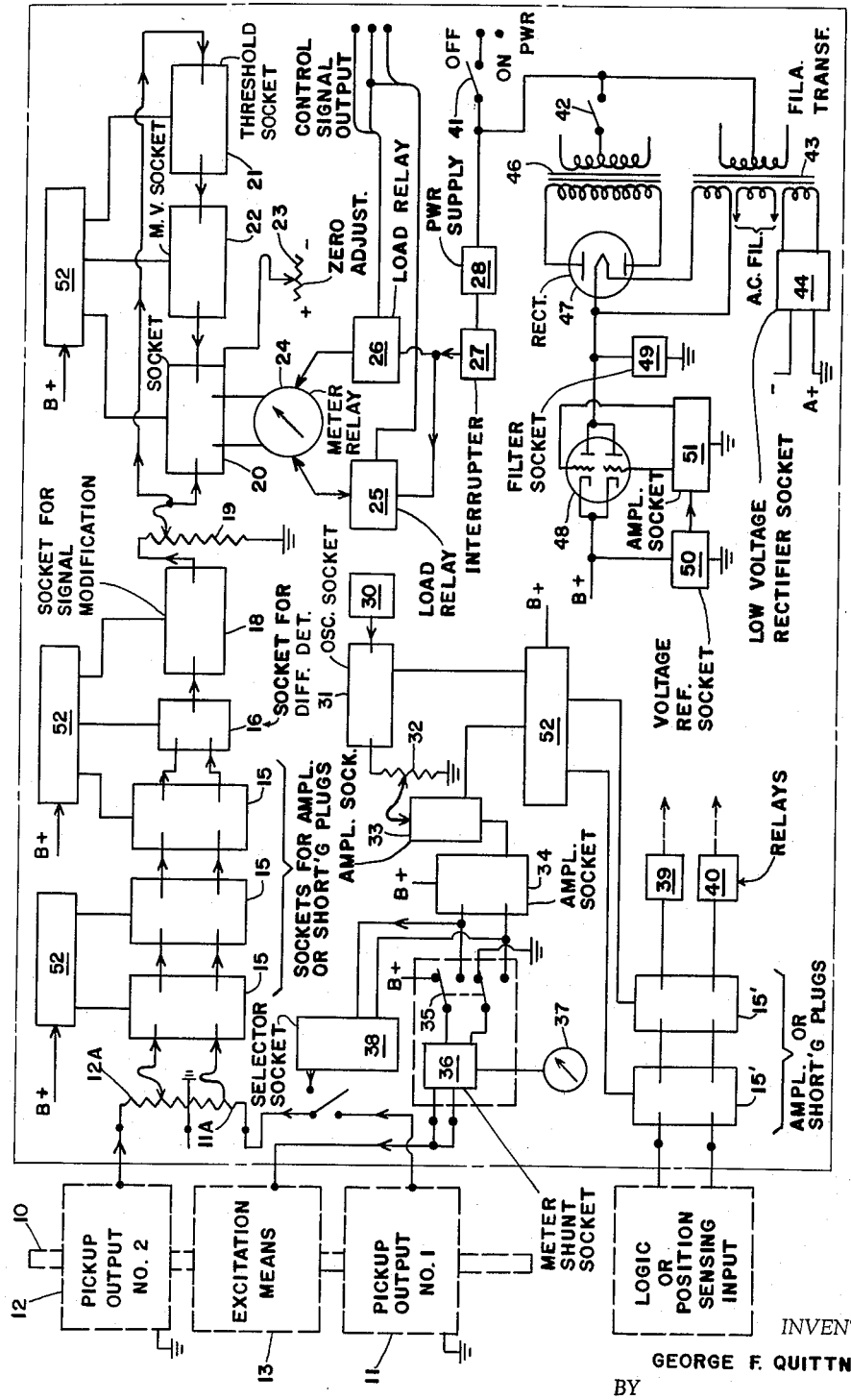
FIG. 1 is a general schematic representation of prewired module sockets for a preferred embodiment of the invention.

Referring first to FIG. 1, illustrating a preferred prewired socket arrangement of the invention for use as with a moving sample 10 passing coils or other pickup units 11 and 12. Terminations are provided for duplicate pickup output adjusting voltage dividers 11A and 12A prewired to a series of sockets 15 each provided for containing or receiving duplicate amplifying stages, one of each pair amplifying signal from voltage divider 11A and the other from voltage divider 12A.

If reference is made to the other cases mentioned, it will be seen that this arrangement will accommodate either pickup coils such as 11 and 12 of S.N. 82,348 for picking up sample 10 discontinuities by a comparison of flux changes, or pickup coils such as 13 and 14 in S.N. 94,472 to sense eddy current changes, or capacity electrodes such as 14 and 15 of S.N. 122,748 to sense changes in capacity with discontinuities in conductive material.

Returning to the present FIG. 1, the amplified outputs from the series of sockets 15 are brought to a socket 16 for difference detection.

The resultant of the comparison stage (at 16) is prewired to a socket 18 for amplification and/or filtration or other suitable processing. An adjustable voltage divider 19 then provides the signal fed to an impedance reducing stage in socket 20 from one connection. If a second signal line is required, as shown and hereinafter explained, it is wired from the same voltage divider wiping tap to several serially wired sockets 21 and 22 and returned to the impedance reducing stage. Sockets 21 and 22 may be provided one with a cut-off amplifier whose bias must be exceeded to produce any output signal at all (thus having an electronic threshold which the signal must exceed) and the other with a monostable multivibrator (known also as a "one-shot" oscillator).

The impedance reducing stage at 20 is provided with balancing means such as an adjustable bias voltage supply 23. The signal next is taken by prewiring to signalling equipment which usefully interprets the prepared comparison stage resultant. Thus the impedance lowering stage 20 may be "read" by a meter-relay 24 having manually adjustable high and low contacts respectively associated with load relays 25 and 26. There may be conventional moving locking coils in the meter movement (not shown), automatic or manual interruption as diagrammatically indicated by the block 27, and a relay power supply 28. Power handling contacts in relays 25 and 26 are brought to suitable terminations as "control signal output" and may be used for controlling alarms, process machine drive, sample marking devices, or the like.

Alternating current excitation prewiring is provided by a socket 30 containing (or for accommodating) a frequency determining module (an LC or RC network, or a piezo-electric mechanically resonant device, for example), an active oscillator module socket 31, an excitation adjustment voltage divider 32, a further amplifying and phase splitting module socket 33, a power output amplifying module socket 34, a selector switch 35 for selection of alternating current or direct current pickup excitation, a socket for a meter shunt module 36 for properly shunting an excitation current indicating meter 37, and terminations for pickup excitation cabling. An additional prewired socket 38 provides for selection of either phase line of alternating current excitation, manual phase shift adjustment of the chosen excitation signal, and by suitable switching the feeding of such a phase-adjusted signal to one input voltage divider such as 11A, in addition to or in place of sensing that one (11) of the two input pickup outputs.

A further line of duplicate amplifier sockets 15' (for receiving additional modules 15' which may be exactly like modules 15 previously mentioned) is prewired to receive signals from other sources such as photo cells, permanent magnet proximity acceleration sensors, or the like, and operate appropriate relays 39 and 40, which may be used to control the time at which "control signal output" lines can effectively cause control action.

Appropriate power supplies are also provided. Operating A.C. is provided from a power line through a general "on-off" switch 41. A standby switch 42 is also provided. A "usually powered" (that is, powered whenever switch 41 is closed, whether standby switch 42 is open or closed) filament transformer 43 supplies a prewired socket 44 used for a regulated low voltage, direct current, and grounded positive supply (which may conveniently be zener diode regulated). This supply is for use in zero adjusting with voltage divider 23 and other biasing purposes, as well as for supplying tube filaments. A higher voltage output transformer 46 controlled by the standby switch 42, supplies a rectifier 47 and series regulator tube 48. There is shown (and assumed prewired) an intervening socket 49 for a filter capacitor module. A socket 50 is used for a voltage reference tube (and perhaps a difference reading circuits). A socket 51 is prewired to receive a D.C. amplifier, to accept the voltage differences measured at socket 50, amplify them, and apply them properly to the grids of the series regulator tube at 48 to provide a regulated B plus power supply. B plus supply lines to the various amplifying stages are assumed decoupled from each other by resistance capacitance low pass filters comprising similar modules 52. General filament wiring to all modules is obviously required, and therefore not shown.

Since much of the advantage of this invention depends on its generality of applicability, on its convertibility to fit a variety of situations, most of the remainder of this specification will be devoted to exhibiting some of the variety of ways the invention can be practiced, using appropriate portions of the prewired arrangements of FIG. 1, described above. With the FIGS. 2, 3, 4, 5 and 6 embodiments it should be understood that decoupling modules 52 may be used as shown in FIG. 1, through omitted from the figures for simplicity. In all the drawings it will be seen that, in addition to other provisions, the invention is characterizable generally by providing prewired plug-in sockets for a series of duplicate amplification stages for amplifying two individually adjusted signals, a stage in which the two amplified signals are compared, and means (such as a vacuum tube voltmeter containing a meter relay and/or power output relays) for signalling changes in the electrical resultant of the comparison. Other features provided include appropriate power supplies, decoupling for the electronic stages, the relays, means providing excitation of various kinds of pickups, additional amplifiers for handling signals originating from other types of transducers to permit automation of certain kinds of industrial processes as herein exemplified, etc.

Figure 2:
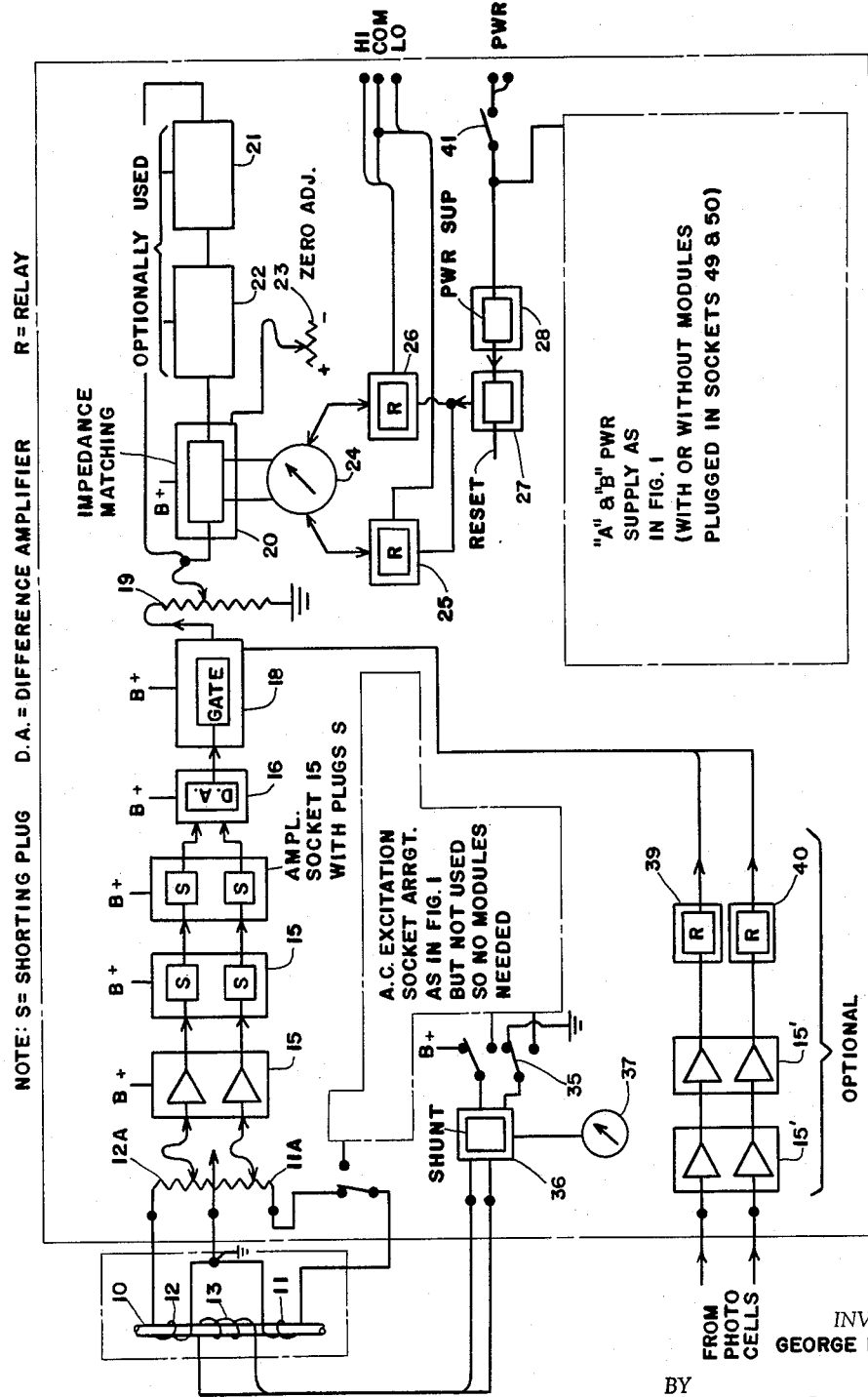
FIG. 2 shows the general schematic as used for one type of non-destructive testing, e.g., with D.C. excitation for finding flaws in magnetic material.

In FIG. 2 is shown a way in which the invention may be practiced, e.g., for distinguishing cut lengths of ferrous pipe which contain butt welds from those which do not. In this case an appropriate means would be a system of three coils displaced along a common (and sample) axis, the central coil being excited by direct current and the other two having a common grounded connection selected so that the remaining output connections will provide equal and like phased signals when excited by stray fields, sample radial motions and the like, but with the two signals differing in phase for sample magnetic discontinuities, as fully disclosed in my copending application Ser. No. 82,348, now abandoned, and replaced by continuation-in-part application Ser. No. 187,875, also referred to elsewhere in this application.

Voltage dividers 11A and 12A serve to set the level of voltages entering the two like amplifying channels (through sockets 15), as well as to balance the two signals for minimum noise output from the difference amplifier at 16 to produce a maximum ratio of signal pulse amplitude to random, irrelevant noise pulse amplitudes. The number of dual amplifier stages (sockets 15) may be varied in accordance with sample speed, pickup output signal size, etc. Shown in FIG. 2 are prewired sockets conveniently supplied with simple "shorting" plugs "S," which connect socket input terminals to output terminals for any particular setup requiring less amplification than another.

Prewired signal modifying element socket 18 may conveniently be used for signal gating, as hereinafter explained. The signal, at those times when the gating circuitry in socket 18 permits, proceeds through the voltage divider 19 to the impedance dropping vacuum tube voltmeter amplifier in socket 20. For relatively slow sample movement rates, meter relay 24 can respond to signals and discriminate between butt weld signals and relatively smaller noise signals by virtue of having adjustable contacts, and sockets 21 and 22 may be left unused. For very high speeds and axially short welds, there is insufficient time for correct pulse indication by the meter relay signal pointer and socket 21 is provided with an amplifier having sufficient bias to normally "cut-off" plate current except when a sufficiently large positive pulse as from a butt weld permits plate current to flow. The conduction pulse is passed on to socket 22 which may be provided with a monostable multivibrator. The multivibrator produces a single output pulse of predetermined amplitude and duration whenever triggered by a pulse large enough to have its effect pass through the cut-off amplifier in socket 21. Since the amplitude and duration of the output of the multivibrator are constant and predetermined, and are applied to the vacuum tube voltmeter comprised of amplifier 20, meter relay 24 and zero adjust control 23, any pulses arising from butt welds, which are distinguishably larger than normal noise, can properly operate meter relay 24. Relays in sockets 25 and 26 operate in response to the closing of contacts in meter relay 24 to provide output signals for automatically removing or marking or otherwise treating pipe sections having butt welds. Socket 27 provides reset (power supply interruption following a time delay) to permit the meter relay to "unlock" and be ready for further signalling.

The modularization of additional apparatus in sockets 28, 49, 50 and 51, also results in easy maintenance. The precise circuitry of such power supply (or any of the) modules may be conventional and is not claimed as part of the present invention.

The pipe sections to be passed through the pickup produce, in each case, very large irrelevant signals as pipe ends enter and leave the pickup. It may easily be arranged to have such signals disregarded by the application of the following set of rules (1) gate at 18 permits no signals to pass (is closed) when no pipe is in vicinity of pickup, (2) gate permits signals to pass (is opened) when a pipe starting end is sensed as having passed through the pickup, (3) gate is closed when a pipe final end is sensed as approaching the pickup. Such pipe positions may be sensed by two photoelectric cells (with light sources) affecting relays in sockets 39 and 40, respectively, one placed just past the pickup to open the gate when its light source is cut-off, and one placed just ahead of the pickup to close the gate when its light source is restored. Sockets are provided for amplifiers 15' for operating the relays in sockets 39 and 40 by the signals from any such photoelectric cell transducers (not shown).

Figure 3:
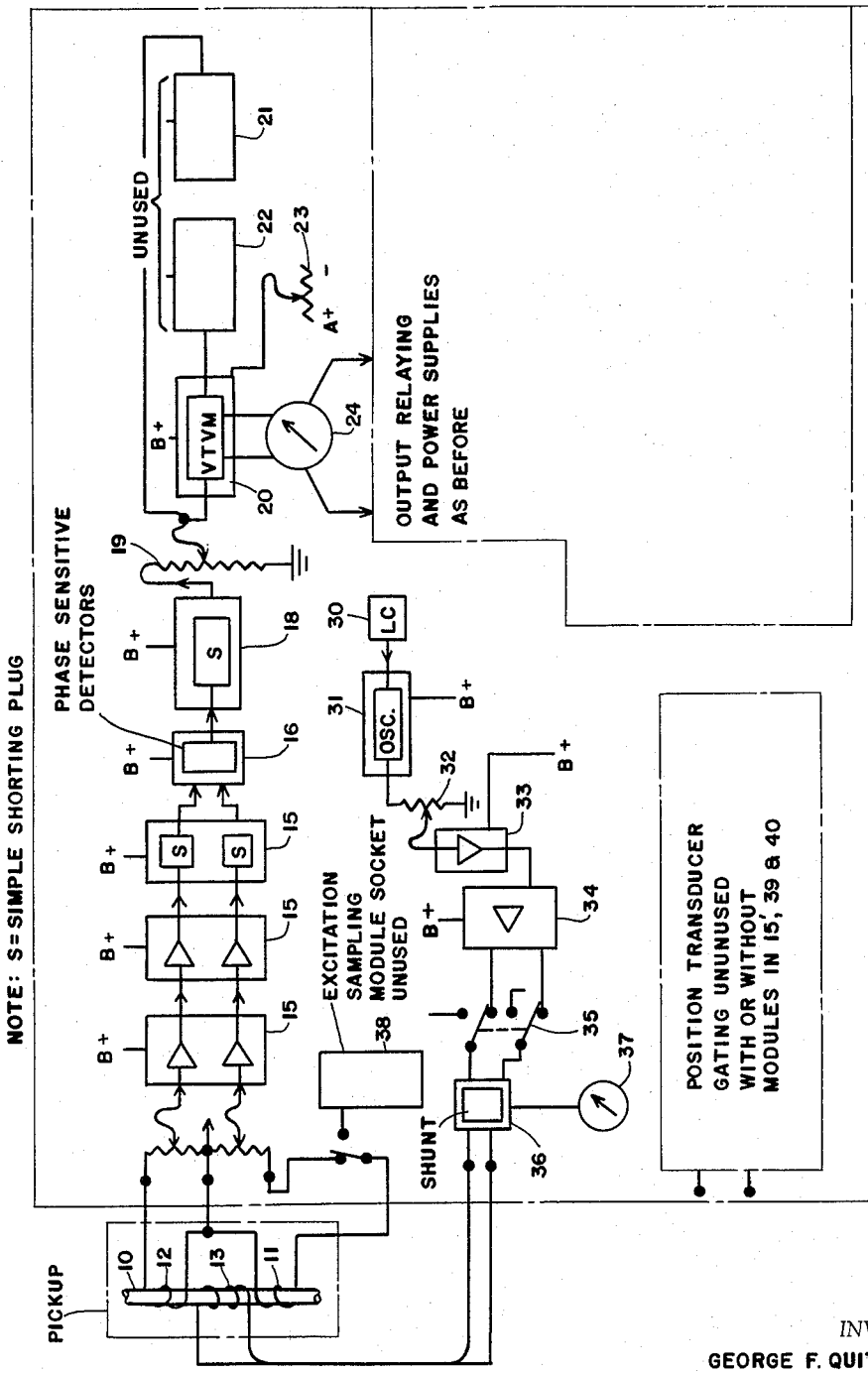
FIG. 3 shows the general schematic as used for another type of non-destructive testing, e.g. with A.C. excitation for finding flaws with coils.

FIG. 3 shows an arrangement of the present invention suited to finding radial flaws in wire or tubing, in accordance with my copending patent application Ser. No. 187,875, filed April 16, 1962, and assigned to the same assignee as the present invention.

The excitation, for such applications, may be alternating current; thus a frequency setting and 180° phase shifting network is plugged into socket 30, a suitable high gain oscillator and a cathode follower (multifunction tube) is used in socket 31, the excitation level is adjusted with the voltage divider 32, an amplifying and phase splitting module is used in socket 33, and push-pull cathode followers may be used in socket 34. Switch 35 is placed in the proper position to connect the pickup with the A.C. excitation output, which is indicated by meter 37 according to the drop across a shunt plugged into socket 36, the shunt output also being rectified within the module. With only relatively minor changes, other circuit features are similar to those described for FIG. 2. At 16 for certain speeds, samples and excitation frequencies, the former difference amplifier may be advantageously replaced by two half-wave rectifiers with RC filters connected subtractively for zero D.C. output voltage at balance, or in other circumstances by specially phase sensitive detectors of various types. In the FIG. 3 case, no gating or amplifying may be required following the difference detector, so that socket 18 may be filled with a shorting plug. Sockets 21 and 22 are preferably not used, unless sample speed or other conditions prevent the meter-relay from responding adequately to signals.

Figure 4:
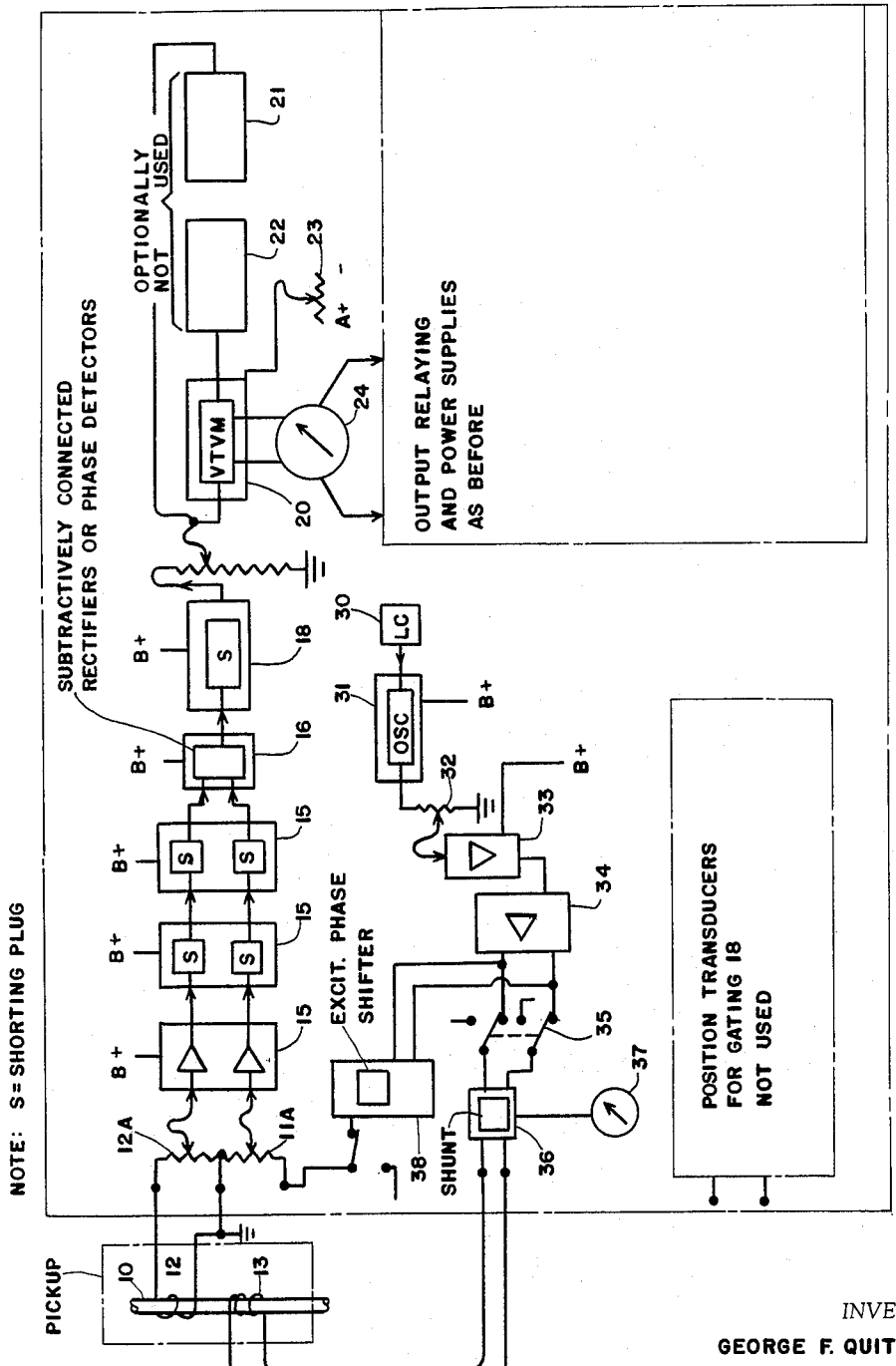
FIG. 4 shows the general schematic as used for another type of non-destructive testing, e.g., for finding flaws with a single position pickup.

In FIG. 4, it is supposed that the object is to find extended defects which begin unabruptly and might be missed by two position comparison arrangements like those of FIGS. 2 and 3. In this case the practice of the invention may be as described for FIG. 3 except that the excitation voltage (selected phase) is sampled, alternated and adjustably phase shifted by a module plugged into socket 38. In this way even gradual changes in permeability, or resistance or diameter may be discovered and marked.

Figure 5:
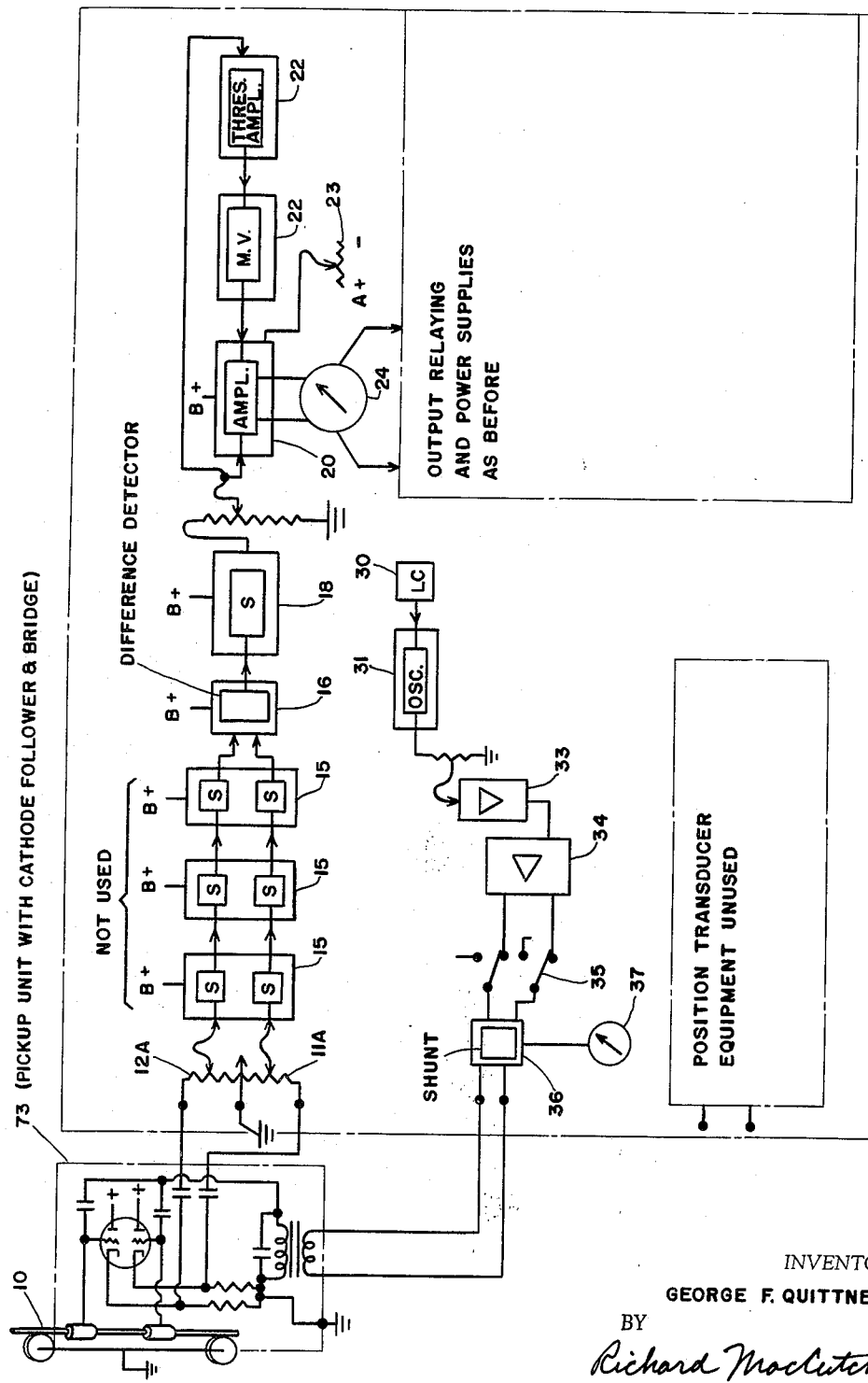
FIG. 5 shows the general schematic as used for another type of non-destructive testing, e.g., for finding flaws in a conductive sample with capacitor electrodes thereabout.

FIG. 5 shows how the present invention may be practiced for the finding of purely dimensional specimen flaws by the capacitive sensing technique disclosed in copending application S.N. 122,748. In this case circuit functions are similar to those described for FIG. 3, except that because of the extreme sensitivity and high output of the separate shielded assembly of pickup bridge with cathode follower at 73 it will often be desirable and possible to eliminate amplifiers at 15 placing shorting plugs in all sockets 15.

FIG. 6 shows how the invention may be practiced for the finding of flaws such as laminations in samples which have reasonably extended area transverse to the direction of sample motion relative to the excitation-pickup coil assembly, such as flat sheets and strip and relatively large diameter tubing as disclosed in the copending application S.N. 94,472. It will be seen that the present invention may be employed substantially as described for FIG. 3, the essential difference in applications being the pickup means employed.

Thus apparatus according to the present invention provides a single, prewired device suited to many types of non-destructive electronic testing by interchanging a relatively small number of plug-in parts. The novel configuration and arrangement of prewiring and other parts permit numerous kinds of non-destructive testing to be performed with the same basic piece of equipment, the different modes of operation being provided by merely interchanging a few plug-in modules in some cases with use of a different sensing and pickup unit or units. This results in decreased first cost and, also, in reduced maintenance cost because essentially all of the electrical or electronic components may be mounted in plug-in modules some of which are interchangeable duplicates of each other, and any of which can be quickly replaced if a defect in operation develops.

In these and other ways the flexibility and general applicability of the invention may be usefully employed, either by a manufacturer of the equipment described, or by his customer who can plug-in about $100 worth of new modules and have a new set of equipment worth the same as his first investment of, for example, $5,000 so long as he does not need to use both at the same moment.

From the disclosed examples it will be understood that the invention is broadly applicable beyond the examples described specifically herein. Both two position comparison (as in FIGS. 2, 3, 5, 6) or internal signal comparison (as in FIG. 4) may be employed. To mention a few of the possible uses not detailed or illustrated: The pickup coils or electrodes discussed may be, instead, radiant energy transducers (photocells, bolometers, radio frequency detectors) used with reflecting and/or emissive samples, or the pickup means may be temperature sensors, or the pickup means may be static magnetic flux detectors (such as saturable reactors, or Hall effect detectors) for while I have illustrated and described particular embodiments, various modifications may obviously be made without departing from the true spirit and scope of our invention which I intend to have defined only by the appended claims taken with all reasonable equivalents.

The word "terminations" as used in the claims is meant to broadly cover plug connectors, sockets, binding posts, or whatever might be used either in terminating individual connections of outside apparatus, or in terminating the prewired assembly of the invention for coupling to such outside apparatus.

I claim:

1. In flaw detection apparatus having electrical-to-field-excitation transducer means arrangeable to link with a relatively moving sample material portion, and having field-excitation-to-electrical signal transducer means arrangeable to link with said portion of relatively moving sample material,
   a signal processing equipment chassis,
   said chassis having plural mechanically engageable electrical socket means mounted thereon,
   a plurality of electronic component containing modules, said modules each having electrical input and output connections mateable with connections on said socket means,
   the chassis socket means comprising:
   a first group of said chassis mounted socket means wired to accept power from an outside source and, when mated with fitting modules by means of the module connections, to provide electronic equipment operating voltage power supplies, including a so-called "B" supply for tubes or transistors,
   a second group of said chassis mounted socket means wire so that the socket means of said second group all accept power in parallel from at least one socket means of said first group and, when mated with suitable modules, provide a plurality of substantially identical "B" power supply connections which are decoupled from one another,
   a third group of said chassis mounted socket means wired so that all accept power from at least one socket of the second group, and, when mated with suitable modules, so that said socket means serially process information-containing signals derivable from the field-excitation-to-electrical signal transducer means.

2. Flaw detection apparatus as in claim 1 further characterized by there being:
   a fourth group of said chassis mounted socket means wired so as to derive "B" power from at least one socket means of the second group and, when mated with suitable modules, to provide power for the electrical-to-field-excitation transducer means.

3. Flaw detection apparatus as in claim 1 further characterized by each socket means and module combination of the third group of chassis mounted socket means providing substantially duplicate side-by-side amplifying channels which are serially connected between sockets to provide multi-stage dual amplifying channels for respectively amplifying individually adjustable signals derivable from two field-excitation-to-electrical transducer means, and a fifth group of said chassis mounted socket means wired to receive dual signals from said third group and, when mated with suitable modules, to provide a readout of difference between dual signals.

4. Flaw detection apparatus as in claim 3 further characterized by the fifth group of socket means, when mated with suitable modules, including a threshold etsablishing device whereby to provide threshold exceeding output signaling responsive to a threshold exceeding difference of signal from the two electrically independent information-containing signals processed by socket means of the third group when associated with suitable modules.

5. Flaw detection apparatus as in claim 3 further characterized by said fifth group of socket means comprising two sub-groups, an "a" subgroup electrically closer to the third group socket means and a "b" sub-group more remote from the third group socket means, and there being a meter relay prewired between the "a" sub-group and the "b" sub-group of socket means, said meter relay having a manually adjustable pointer which by its manual adjustment establishes an adjustable threshold which must be exceeded before a signal is passed from the "a" sub-group socket means to the "b" sub-group means.

6. Flaw detection apparatus as in claim 3 further characterized by means remote from the chassis and for sensing position of sample material, a sixth group of chassis mounted socket means wired to accept power from at least one socket of the second group, and wired to accept signals from said means which senses position of sample material, the fifth group of socket means when fitted with suitable modules including a gate means operable in response to sample material position signals processed by the sixth group of socket means.

References Cited by the Examiner

UNITED STATES PATENTS

| | | | |
|---|---|---|---|
| 2,477,971 | 8/1949 | Drake | 324—37 |
| 2,535,353 | 12/1950 | Drake | 324—37 |
| 2,832,013 | 4/1958 | Pedersen | 317—101 |
| 2,885,603 | 5/1959 | Rose | 317—101 |
| 2,947,914 | 8/1960 | Simons | 317—101 |
| 3,020,472 | 2/1962 | Cauley | 324—34 |

RICHARD B. WILKINSON, *Primary Examiner.*

WALTER L. CARLSON, *Examiner.*